US006850488B1

United States Patent
Wesley et al.

(10) Patent No.: US 6,850,488 B1
(45) Date of Patent: Feb. 1, 2005

(54) METHOD AND APPARATUS FOR FACILITATING EFFICIENT FLOW CONTROL FOR MULTICAST TRANSMISSIONS

(75) Inventors: Joseph S. Wesley, Quincy, MA (US); Dah Ming Chiu, Acton, MA (US); Miriam C. Kadansky, Westford, MA (US); Joseph E. Provino, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/549,805

(22) Filed: Apr. 14, 2000

(51) Int. Cl.[7] .......................... H04L 12/00; H04L 12/28; G08C 25/02
(52) U.S. Cl. ........................ 370/230; 370/236; 370/252
(58) Field of Search ............................ 370/230, 230.1, 370/235, 236, 252, 253, 389, 390, 400, 401, 468, 477

(56) References Cited

U.S. PATENT DOCUMENTS

| | | | | |
|---|---|---|---|---|
| 4,769,815 A | * | 9/1988 | Hinch et al. | 370/236 |
| 5,130,986 A | * | 7/1992 | Doshi et al. | 370/231 |
| 5,313,454 A | * | 5/1994 | Bustini et al. | 370/231 |
| 5,434,860 A | * | 7/1995 | Riddle | 370/232 |
| 5,541,927 A | * | 7/1996 | Kristol et al. | 370/408 |
| 5,727,002 A | * | 3/1998 | Miller et al. | 714/748 |
| 6,122,275 A | * | 9/2000 | Karol et al. | 370/389 |
| 6,269,080 B1 | * | 7/2001 | Kumar | 370/236 |
| 6,298,041 B1 | * | 10/2001 | Packer | 370/231 |
| 6,438,101 B1 | * | 8/2002 | Kalampoukas et al. | 370/229 |

* cited by examiner

Primary Examiner—Hassan Kizou
Assistant Examiner—Ahmed Elallam
(74) Attorney, Agent, or Firm—Park, Vaughan & Fleming

(57) ABSTRACT

One embodiment of the present invention provides a system that facilitates efficient flow control for data transmissions between a sender and a plurality of receivers. The system operates by sending a stream of packets from the sender to the plurality of receivers, wherein the packets include information specifying a sampling window for the stream of packets. The sender subsequently receives feedback information from the plurality of receivers, wherein a receiver sends feedback information to the sender if a congestion condition occurs at the receiver while receiving packets within the sampling window. In response to the feedback information, the sender adjusts a rate of transmission for the stream of packets. In one embodiment of the present invention, the feedback information from the receivers is aggregated at intermediate nodes prior to reaching the sender in order to eliminate redundant feedback information. In one embodiment of the present invention, the sender communicates with the plurality of receivers through a tree of nodes, wherein the sender is a root node of the tree.

30 Claims, 2 Drawing Sheets

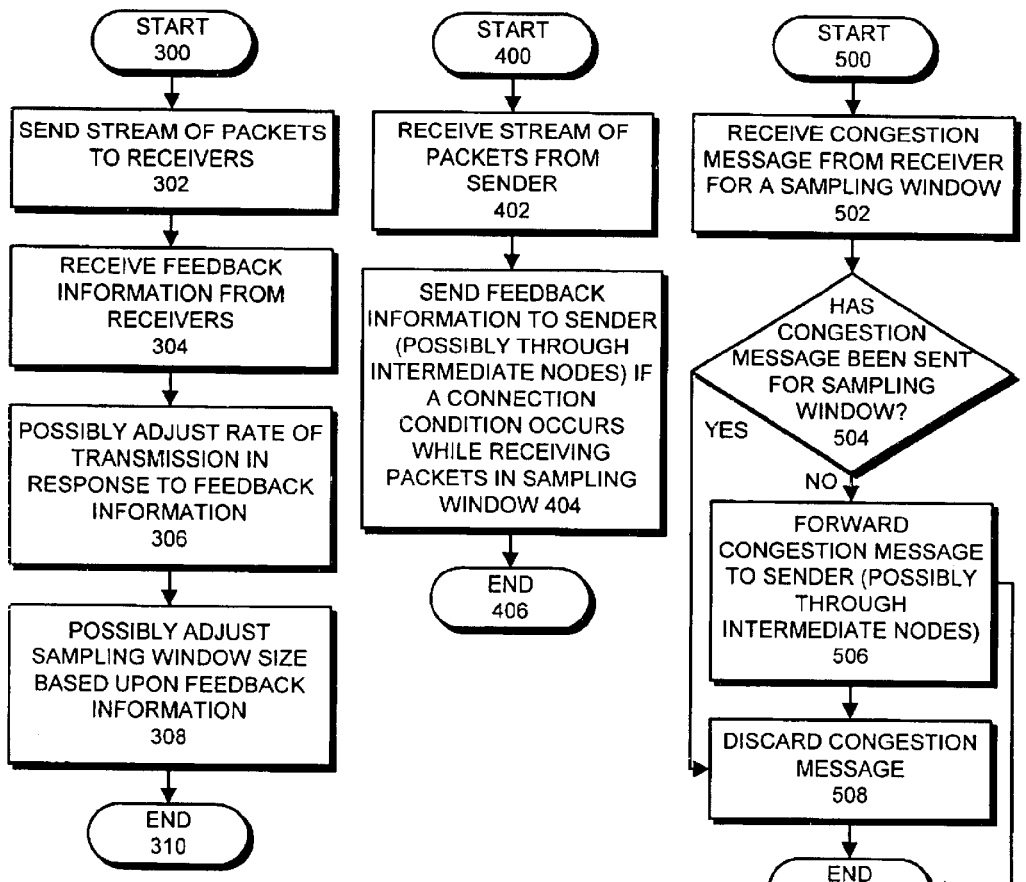

METHOD AND APPARATUS FOR FACILITATING EFFICIENT FLOW CONTROL FOR MULTICAST TRANSMISSIONS

BACKGROUND

1. Field of the Invention

The present invention relates to data transmissions across computer networks. More specifically, the present invention relates to a method and an apparatus for facilitating efficient flow control for multicast or broadcast data transmissions.

2. Related Art

One very common type of transmission across a computer network is a multicast or a broadcast transmission, in which a single sender transmits the same data to multiple receivers. In some cases, the single sender can transmit data to thousands of receivers.

One challenge in supporting multicast or broadcast data transmissions is to control the rate at which the sender transmits packets to receivers so that slower receivers do not get overloaded, which can cause packets be lost. In order to control the transmission rate, it is useful to receive feedback information from the receivers indicating whether or not the receivers are experiencing congestion as a result of the data transmission. This allows the sender to reduce its rate of data transmission if the receivers are experiencing congestion, and possibly to increase its rate of transmission if the receivers are not experiencing congestion.

However, receiving feedback information from a large number of receivers can be impractical, because the sender can be flooded with feedback messages. Consequently, the sender will not be able to process the feedback information in a timely manner.

One solution to this problem is to send a multicast or broadcast data transmission without receiving feedback. However, doing so can cause network congestion, and is likely to lead to sub-optimal transfer rates.

Some researchers have explored the idea of basing flow control decisions on round trip time (RTT) between sender and receiver. However, measuring RTT for a broadcast or multicast transmission can be very difficult in practice because of complications involved in synchronizing clocks to measure RTT. Also, the problem of flooding the sender with feedback information still remains.

What is needed is a method and an apparatus for providing feedback information during a multicast or a broadcast data transmission from a plurality of receivers to a sender so that the sender can make good flow control decisions without flooding the sender with a large number of feedback messages.

SUMMARY

One embodiment of the present invention provides a system that facilitates efficient flow control for data transmissions between a sender and a plurality of receivers. The system operates by sending a stream of packets from the sender to the plurality of receivers, wherein the packets include information specifying a sampling window for the stream of packets. The sender subsequently receives feedback information from the plurality of receivers, wherein a receiver sends feedback information to the sender if a congestion condition occurs at the receiver while receiving packets within the sampling window. In response to the feedback information, the sender adjusts a rate of transmission for the stream of packets.

In one embodiment of the present invention, the feedback information from the receivers is aggregated at intermediate nodes prior to reaching the sender in order to eliminate redundant feedback information.

In one embodiment of the present invention, the sender communicates with the plurality of receivers through a tree of nodes, wherein the sender is a root node of the tree.

In one embodiment of the present invention, adjusting the rate of transmission can include decreasing the rate of transmission if the feedback information indicates that some receivers experienced congestion while receiving packets in the sampling window.

In one embodiment of the present invention, a packet in the stream of packets includes, a sequence number for the packet, a begin sampling window sequence number identifying a beginning packet of the sampling window, and an end sampling window sequence number identifying an ending packet of the sampling window.

In one embodiment of the present invention, the congestion condition occurs for a given receiver if a fixed percentage of packets within the sampling window are not received by the given receiver.

In one embodiment of the present invention, the system additionally adjusts a sampling window size for a subsequent sampling window based upon the feedback information.

One embodiment of the present invention provides a system that facilitates efficient flow control for data transmissions between a sender and a plurality of receivers. The system operates by receiving a stream of packets from the sender at a receiver in the plurality of receivers, wherein the packets include information specifying a sampling window for the stream of packets. The receiver sends feedback information to the sender if a congestion condition occurs at the receiver while receiving packets within the sampling window.

BRIEF DESCRIPTION OF THE FIGURES

FIG. 2 illustrates the structure of a packet in accordance with an embodiment of the present invention.

FIG. 3 is a flow chart illustrating the operation of a sender in accordance with an embodiment of the present invention.

FIG. 4 is a flow chart illustrating the operation of a receiver in accordance with an embodiment of the present invention.

FIG. 5 is a flow chart illustrating the operation of an internal node receiver in accordance with an embodiment of the present invention.

FIG. 6 illustrates an example sampling window in accordance with an embodiment of the present invention.

DETAILED DESCRIPTION

Figure 1:
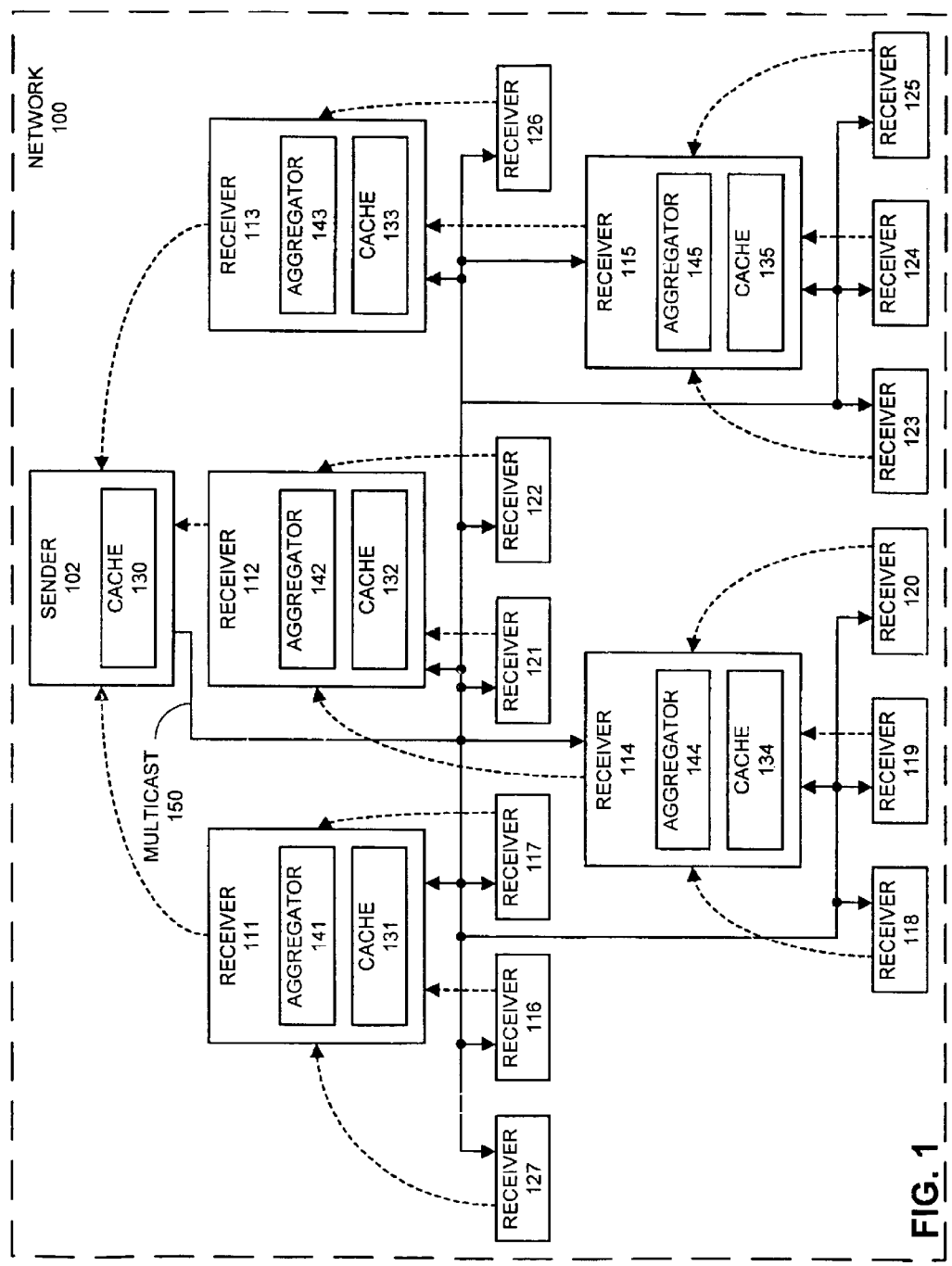
FIG. 1 illustrates communications between a sender and a plurality of receivers in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Sender and Receivers

FIG. 1 illustrates communications between a sender 102 and a plurality of receivers 111–127 in accordance with an embodiment of the present invention. Note that sender 102 and receivers 111–127 are coupled together through network 100. Network 100 can include any type of wire or wireless communication channel capable of coupling together computing nodes. This includes, but is not limited to, a local area network, a wide area network, or a combination of networks. In one embodiment of the present invention, network 100 includes the Internet.

Sender 102 can include any node on network 100 that is capable of sending a multicast or broadcast 150 to receivers 111–127. Receivers 111–127 can include any nodes on network 100 that are capable of receiving a multicast or broadcast 150 from sender 102. Note that sender 102 and receivers 111–127 can be based on any type of computer system, including, but not limited to, a computer system based on a microprocessor, a mainframe computer, a digital signal processor, a personal organizer, a device controller, and a computational engine within an appliance.

Sender 102 sends multicast message to receivers 111–127 through a tree-based multicast distribution scheme. (Although note that the present invention can also be applied to non-tree based distribution schemes.)

The tree-based distribution scheme includes sender 102 at the root of the tree and receivers 111–127, which are arranged in a hierarchical manner extending from the root of the tree. Some of the receivers 111–115 are internal nodes in the tree, and other receivers 116–127 are leaf nodes.

Note that sender 102 and internal node receivers 111–115 include caches 130–135. Caches 130–135 can be used to store data in transit between sender 102 and receivers 111–127, as well as return messages from receivers 111–127 to sender 102.

Also note that internal node receivers 111–115 include aggregators 141–145, respectively. Aggregators 141–145 keep track of feedback messages from receivers 111–127 and eliminate redundant feedback messages so that sender 102 does not get flooded with feedback messages.

During operation, sender 102 sends a multicast (or broadcast) 150 to receivers 111–127. Multicast 150 is generally in the form of a stream of packets. Receivers 111–127 return feedback messages to sender 102 if any of receivers 111–127 experience congestion while receiving the stream of packets. Aggregators 141–145 collapse redundant feedback messages, if necessary, to ensure that sender 102 does not get flooded by the feedback messages. If sender 102 receives any feedback messages indicating that there is congestion at any of receivers 111–127, sender 102 adjust is transmission rate accordingly to alleviate the congestion condition.

Structure of Packet

FIG. 2 illustrates the structure of a packet 200 in accordance with an embodiment of the present invention. Each packet in multicast 150 contains a number of fields within the packet header. The first field is a sequence number 202, which specifies where the packet fits into a stream of packets that has consecutive sequence numbers. The next two fields define a "sampling window." Begin sampling field 204 specifies a sequence number of a packet that starts the sampling window, and end sampling field 206 specifies a sequence number of a field that ends a sampling window. End sampling field 206 may also indicate the point at which feedback information should be reported to sender 102.

Note sampling window specifications are generally included in packets in the sampling window for which some processing must be carried out by receivers 111–127. For example, in the case where receivers 111–127 only compute feedback information at the time they receive an end sample packet, it is only necessary to include the sampling window information in the end sample packet.

However, the sampling window information may additionally be attached to other packets to ensure that even if one or more packets are lost, the receivers will respond with feedback information. For example, the sampling window information may be attached to packets following the end sample packet. In this way, if a receiver misses the end sample packet, the receiver will still be able to provide feedback for the sampling window.

Operation of Sender

FIG. 3 is a flow chart illustrating the operation of sender 102 in accordance with an embodiment of the present invention. Sender 102 sends a multicast 150 in the form of a stream of packets to receivers 111–127 (step 302). Note that packets in the stream of packets includes sampling window information as is described above. In response to the stream of packets, sender 102 receives feedback information from receivers 111–127 (step 304). If this feedback information indicates that some of receivers 111–127 are experiencing congestion in receiving the stream of packets, sender 102 may reduces its rate of transmission (step 306). Conversely, if the feedback information indicates that none of receivers 111–127 are experiencing congestion, sender 102 may increase its rate of transmission. Sender 102 may additionally adjust the sampling window size in response to the feedback information (step 308).

Note that sender 102 does not know beforehand how long it takes for feedback messages for a particular sampling window to propagate back to sender 102. For each sampling window, sender 102 picks a "decision point" sequence number. Sender 102 waits until the decision point packet is transmitted before assembling feedback messages for the current sampling window. For example, the decision point sequence number may be given by end sampling sequence number+N, where N is a constant value.

If additional feedback information for the sampling window is returned after the decision point packet is sent, this additional feedback information is not used in making flow control decisions. However, sender 102 can use this information to decide to increase the value of N for subsequent sampling windows.

In one embodiment of the present invention, sender 102 continuously samples congestion conditions from receivers 111–127 using back-to-back sampling windows. Sender 102 also adjusts the sampling window size from window to window. Note that sampling window size is determined at a decision point within the sampling window. Hence, sender 102 does not know the new sampling window's end sampling sequence number until the decision point is reached. This is not a problem, however, since the receivers do not have to determine if a congestion condition exists until after receiving the end sample packet. Furthermore, specifications for the current sampling window are attached to the first few packets of the following sampling window.

For example, referring the FIG. 6, the previous sampling window is (5, 9), the current sampling window is (10, 15) and the next sampling window is (16, 20). In this example, the decision point for sampling window (5, 9) occurs after transmitting packet 12. After this decision point, sender 102 knows that the next window is (10, 15), and hence includes sampling window specifications for sampling window (10, 15) starting from packet 13 onwards.

Note that the above-described process enables sender 102 to solicit feedback at whatever frequency sender 102 desires because the sampling windows do not have to occur back-to-back as described above.

Furthermore, there is no need to compute round trip time (RTT), which can be very hard to do for a multicast transmission. Note that the above-described scheme dynamically adapts to different round trip times of the receiver population.

Also note that other non-tree-based report suppression techniques (such as timer-based backoff) can be used in addition to aggregation to achieve scalability.

Operation of Receiver

FIG. 4 is a flow chart illustrating the operation of a receiver in accordance with an embodiment of the present invention. A receiver first receives a stream of packets from a sender (step 402). In response to this stream of packets, if a congestion condition occurs while receiving the stream of packets, the receiver sends feedback information to the sender. In the case where the receiver is directly coupled to the sender, the receiver sends the feedback information directly to the sender. When the receiver is linked to the sender through an intermediate node, the receiver sends the feedback information to the intermediate node, which in turn forwards the message to its internal node or to the sender (if the intermediate node is coupled directly to the sender) (step 404).

The congestion condition is defined with respect to a sampling window. For example, a congestion condition may be defined as a certain percentage of the packets within the sampling window being lost.

The feedback information returned to sender 102 includes an identifier for the sampling window as well as other feedback information. This feedback information is returned to sender 102 as soon as receiver 127 finishes processing the end sample packet (or the earliest subsequent packet if the end sample packet is missed).

A receiver that joins after a session has started is known as a "late joiner." A late joiner does not send any feedback reports for the current window, but rather waits for a new window.

Operation of Intermediate Node

FIG. 5 is a flow chart illustrating the operation of an internal node receiver, such as receiver 111, in accordance with an embodiment of the present invention. Note that internal node receiver 111 is a receiver, and hence, returns feedback information as is described with reference FIG. 4 above.

Internal node receiver 111 additionally forwards feedback information originating from other receivers to sender 102. For example, receiver 111 forwards feedback information originating from receivers 116, 117 and 127 to sender 102.

While performing this forwarding function, receiver 111 aggregates the feedback information, if necessary, using aggregator 141. This involves receiving a congestion message for a given sampling window from a receiver, such as receiver 127 (step 502). Receiver 111 then determines if a congestion message has already been sent to sender 102 for the given sampling window (step 504). If not, receiver 111 forwards the congestion message to sender 102 (step 506). Otherwise, receiver 111 discards the congestion message bar not forwarding it to sender 102 (step 508).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating efficient flow control for data transmissions between a sender and a plurality of receivers, comprising:

sending a stream of packets from the sender to the plurality of receivers;

wherein packets in the stream of packets include information specifying a sampling window for the stream of packets, and wherein the sampling window is established without determining a round trip time to the plurality of receivers and without having to wait for the round trip time to elapse before specifying the sampling window;

receiving feedback information from the plurality of receivers, wherein a receiver sends feedback information to the sender if a congestion condition occurs at the receiver while receiving packets within the sampling window, wherein the feedback information received from the plurality of receivers is aggregated at intermediate nodes prior to reaching the sender to eliminate redundant information received from the plurality of receivers, and wherein feedback information aggregated at intermediate nodes is sent to a single upstream node; and adjusting a rate of transmission for the stream of packets in response to the feedback information.

2. The method of claim 1, wherein the sender communicates with the plurality of receivers through a tree of nodes, wherein the sender is a root node of the tree.

3. The method of claim 1, wherein adjusting the rate of transmission includes decreasing the rate of transmission if the feedback information indicates that some receivers in the plurality of receivers experienced congestion while receiving packets in the sampling window.

4. The method of claim 1, wherein a packet in the stream of packets includes, a sequence number for the packet;

a begin sampling window sequence number identifying a beginning packet of the sampling window; and an end sampling window sequence number identifying an ending packet of the sampling window.

5. The method of claim 1, wherein the congestion condition occurs for a given receiver if a fixed percentage of packets within the sampling window are not received by the given receiver.

6. The method of claim 1, further comprising adjusting a sampling window size for a subsequent sampling window based upon the feedback information.

7. A method for facilitating efficient flow control for data transmissions between a sender and a plurality of receivers, comprising:

receiving a stream of packets from the sender at a receiver in the plurality of receivers;

wherein packets in the stream of packets include information specifying a sampling window for the stream of packets, and wherein the sampling window is established without determining a round trip time to the plurality of receivers and without having to wait for the round trip time to elapse before specifying the sampling window;

sending feedback information to the sender if a congestion condition occurs at the receiver while receiving packets within the sampling window;

aggregating the feedback information prior to reaching the sender to eliminate redundant information from the plurality of receivers, wherein feedback information aggregated at intermediate nodes is sent to a single upstream node; and allowing the sender to adjust a rate of transmission for the stream of packets in response to the feedback information.

8. The method of claim 7, wherein the sender communicates with the plurality of receivers through a tree of nodes, wherein the sender is a root node of the tree.

9. The method of claim 7, wherein a packet in the stream of packets includes, a sequence number for the packet;

a begin sampling window sequence number identifying a beginning packet of the sampling window; and an end sampling window sequence number identifying an ending packet of the sampling window.

10. The method of claim 7, wherein the congestion condition occurs if a fixed percentage of packets within the sampling window are not received by the receiver.

11. A computer-readable storage medium storing instructions that when executed by a computer cause the computer to perform method for facilitating efficient flow control for data transmissions between a sender and a plurality of receivers, the method comprising:

sending a stream of packets from the sender to the plurality of receivers;

wherein packets in the stream of packets include information specifying a sampling window for the stream of packets, and wherein the sampling window is established without determining a round trip time to the plurality of receivers and without having to wait for the round trip time to elapse before specifying the sampling window;

receiving feedback information from the plurality of receivers, wherein a receiver sends feedback information to the sender if a congestion condition occurs at the receiver while receiving packets within the sampling window, wherein the feedback information received from the plurality of receivers is aggregated at intermediate nodes prior to reaching the sender to eliminate redundant information received from the plurality of receivers, and wherein feedback information aggregated at intermediate nodes is sent to a single upstream node; and adjusting a rate of transmission for the stream of packets in response to the feedback information.

12. The computer-readable storage medium of claim 11, wherein the sender communicates with the plurality of receivers through a tree of nodes, wherein the sender is a root node of the tree.

13. The computer-readable storage medium of claim 11, wherein adjusting the rate of transmission includes decreasing the rate of transmission if the feedback information indicates that some receivers in the plurality of receivers experienced congestion while receiving packets in the sampling window.

14. The computer-readable storage medium of claim 11, wherein a packet in the stream of packets includes, a sequence number for the packet;

a begin sampling window sequence number identifying a beginning packet of the sampling window; and an end sampling window sequence number identifying an ending packet of the sampling window.

15. The computer-readable storage medium of claim 11, wherein the congestion condition occurs for a given receiver if a fixed percentage of packets within the sampling window are not received by the given receiver.

16. The computer-readable storage medium of claim 11, wherein the method further comprises adjusting a sampling window size for a subsequent sampling window based upon the feedback information.

17. A computer-readable storage medium storing instructions that when executed by a computer cause the computer to perform method for facilitating efficient flow control for data transmissions between a sender and a plurality of receivers, the method comprising:

receiving a stream of packets from the sender at a receiver in the plurality of receivers;

wherein packets in the stream of packets include information specifying a sampling window for the stream of packets, and wherein the sampling window is established without determining a round trip time to the plurality of receivers and without having to wait for the round trip time to elapse before specifying the sampling window;

sending feedback information to the sender if a congestion condition occurs at the receiver while receiving packets within the sampling window;

aggregating the feedback information prior to reaching the sender to eliminate redundant information from the plurality of receivers, wherein feedback information aggregated at intermediate nodes is sent to a single upstream node; and allowing the sender to adjust a rate of transmission for the stream of packets in response to the feedback information.

18. The computer-readable storage medium of claim 17, wherein the sender communicates with the plurality of receivers through a tree of nodes, wherein the sender is a root node of the tree.

19. The computer-readable storage medium of claim 17, wherein a packet in the stream of packets includes, a sequence number for the packet;

a begin sampling window sequence number identifying a beginning packet of the sampling window; and an end sampling window sequence number identifying an ending packet of the sampling window.

20. The computer-readable storage medium of claim 17, wherein the congestion condition occurs if a fixed percentage of packets within the sampling window are not received by the receiver.

21. An apparatus that facilitates efficient flow control for data transmissions between a sender and a plurality of receivers, comprising:
- a sending mechanism that sends a stream of packets from the sender to the plurality of receivers;
- wherein packets in the stream of packets include information specifying a sampling window for the stream of packets, and wherein the sampling window is established without determining a round trip time to the plurality of receivers and without having to wait for the round trip time to elapse before specifying the sampling window;
- a receiving mechanism that receives feedback information from the plurality of receivers, wherein a receiver sends feedback information to the sender if a congestion condition occurs at the receiver while receiving packets within the sampling window, wherein the feedback information received from the plurality of receivers is aggregated at intermediate nodes prior to reaching the sender to eliminate redundant information received from the plurality of receivers, and wherein feedback information aggregated at intermediate nodes is sent to a single upstream node; and
- an adjustment mechanism within the sending mechanism that adjusts a rate of transmission for the stream of packets in response to the feedback information.

22. The apparatus of claim 21, wherein the sender communicates with the plurality of receivers through a tree of nodes, wherein the sender is a root node of the tree.

23. The apparatus of claim 21, wherein the adjustment mechanism is configured to decrease the rate of transmission if the feedback information indicates that some receivers in the plurality of receivers experienced congestion while receiving packets in the sampling window.

24. The apparatus of claim 21, wherein a packet in the stream of packets includes,
- a sequence number for the packet;
- a begin sampling window sequence number identifying a beginning packet of the sampling window; and
- an end sampling window sequence number identifying an ending packet of the sampling window.

25. The apparatus of claim 21, wherein the congestion condition occurs for a given receiver if a fixed percentage of packets within the sampling window are not received by the receiver.

26. The apparatus of claim 21, wherein the adjustment mechanism is configured to adjust a sampling window size for a subsequent sampling window based upon the feedback information.

27. An apparatus that facilitates efficient flow control for data transmissions between a sender and a plurality of receivers, comprising:
- a receiving mechanism that receives a stream of packets from the sender at a receiver in the plurality of receivers;
- wherein packets in the stream of packets include information specifying a sampling window for the stream of packets, and wherein the sampling window is established without determining a round trip time to the plurality of receivers and without having to wait for the round trip time to elapse before specifying the sampling window;
- an aggregation mechanism that aggregates the feedback information prior to reaching the sender to eliminate redundant information from the plurality of receivers, wherein feedback information aggregated at intermediate nodes is sent to a single upstream node; and
- a sending mechanism that sends feedback information to the sender if a congestion condition occurs at the receiver while receiving packets within the sampling window.

28. The apparatus of claim 27, wherein the sender communicates with the plurality of receivers through a tree of nodes, wherein the sender is a root node of the tree.

29. The apparatus of claim 27, wherein a packet in the stream of packets includes,
- a sequence number for the packet;
- a begin sampling window sequence number identifying a beginning packet of the sampling window; and
- an end sampling window sequence number identifying an ending packet of the sampling window.

30. The apparatus of claim 27, wherein the congestion condition occurs if a fixed percentage of packets within the sampling window are not received by the receiver.

* * * * *